Nov. 10, 1964          F. H. SAMUELSON          3,156,810
PROTECTIVE DEVICE FOR MOVABLE GUN VIEWING SYSTEM
Filed Oct. 24, 1962
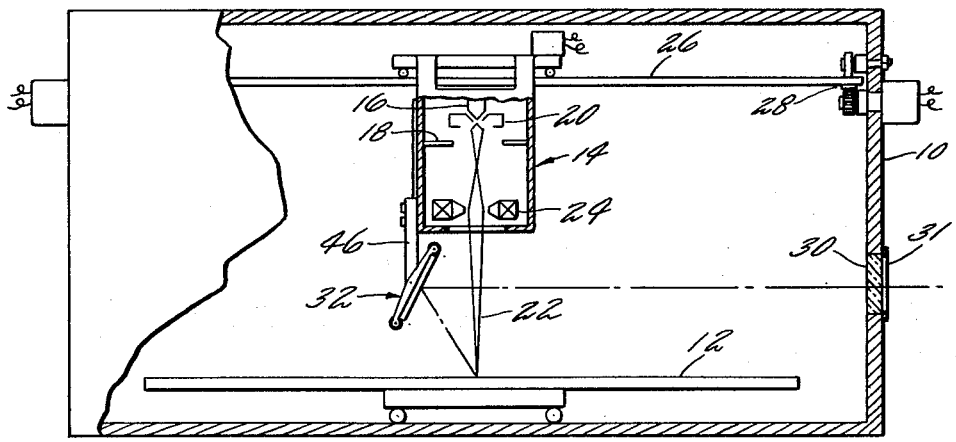
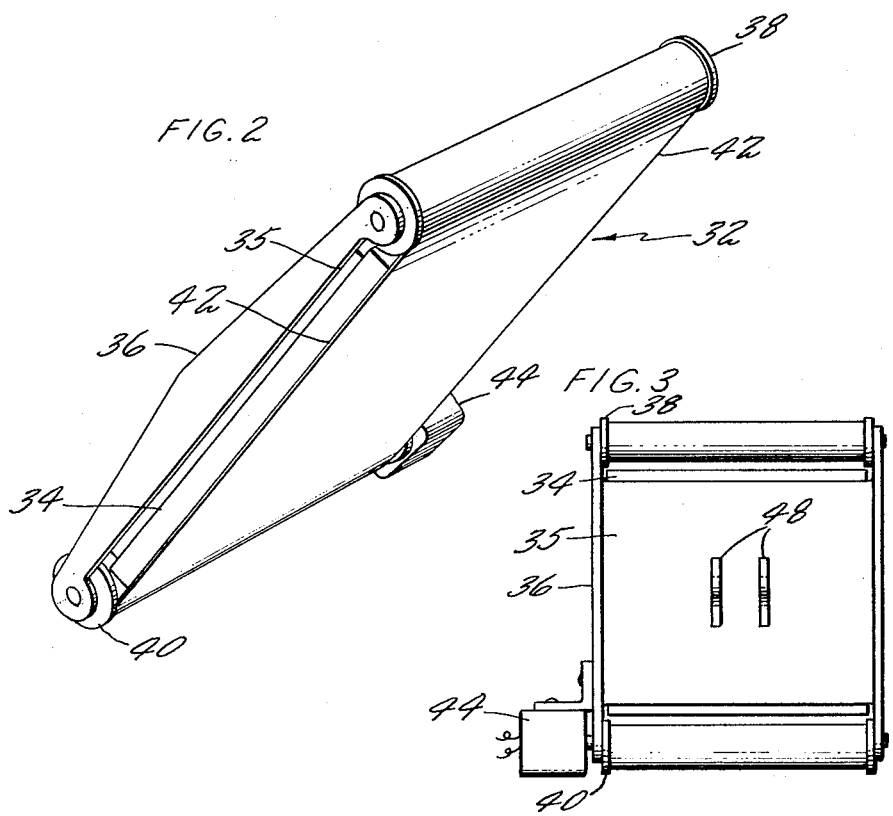
INVENTOR
FRED H. SAMUELSON
BY
ATTORNEY

United States Patent Office 3,156,810
Patented Nov. 10, 1964

3,156,810
PROTECTIVE DEVICE FOR MOVABLE
GUN VIEWING SYSTEM
Fred H. Samuelson, Thompsonville, Conn., assignor to
United Aircraft Corporation, East Hartford, Conn., a
corporation of Delaware
Filed Oct. 24, 1962, Ser. No. 232,738
1 Claim. (Cl. 219—121)

My invention relates to working materials with a highly energized beam. More particularly, my invention relates to keeping the means by which the material being worked with such a beam is viewed from being rendered opaque by vapors released from the material.

While not limited thereto, my invention has particular utility when used with an electron beam machine. Electron beam machines, as they are generally known, are devices which use the kinetic energy of an electron beam to work a material. U.S. Patent No. 2,793,281, issued May 21, 1957, to K. H. Steigerwald, discloses such a machine. These machines operate by generating a highly focused beam of electrons. The electron beam is a welding, cutting and machining tool which has practically no mass but has high kinetic energy because of the extremely high velocity imparted to the electrons. Transfer of this kinetic energy to the lattice electrons of the workpiece generates higher lattice vibrations which causes an increase in the temperature within the impingement area sufficient to accomplish work. In fact, the temperature becomes so high that the material melts and even evaporates. This evaporation, in turn, permits deep penetration of the workpiece by the beam. That is, deep penetration can only be achieved by vaporization of a fine channel in the material.

In performing work with an electron beam, it is desirable and at times essential to visually observe the material being worked. This may be accomplished by providing a leaded glass viewing port in the side of the electron beam machine's vacuum chamber or, in machines where very fine work is to be performed, by providing an optical system including means for magnifying the image of the area being worked. U.S. Patent No. 2,940,-172, issued July 5, 1960, to W. Opitz et al., discloses an electron beam machine having such an optical system including a microscope. Regardless of which approach to viewing is followed, a problem is presented by the condensation of the vaporized material on the mirrors and other elements of the viewing system which are located adjacent to the beam impingement point. The accumulation of these vapor deposits on the surfaces of the viewing mechanism soon cloud the surfaces to an extent where it becomes impossible to observe the material being worked. This, in turn, necessitates a time-consuming work stoppage for cleaning or replacing the clouded surface.

My invention overcomes the above stated problems by providing means for preventing vapors generated during the working of a material with a highly energized beam from condensing on the surfaces through which the workpiece is viewed.

It is therefore, an object of my invention to prevent accumulation of deposits on the viewing surfaces of a machine which employs an energized beam to work a material.

It is another object of my invention to eliminate the necessity for periodic cleaning of the means through which a material being worked with a highly energized beam is viewed.

It is also an object of my invention to prevent the impairment, through vapor deposition, of the elements which enable the work in an electron beam machine to be viewed during operation of the machine.

These and other objects of my invention are accomplished by placing a transparent film, which may be electrically conductive, over the surface of the element of the viewing system that it is desired to protect. The apparatus of my invention is constructed so as to permit the film to be advanced when vapor deposits accumulate thereon. Thus, an unimpaired viewing surface is always presented to the operator.

My invention may be better understood and its numerous advantages will become apparent to those skilled in the art by reference to the accompanying drawing wherein like reference numerals refer to like elements in the different figures and in which:

FIGURE 1 is a cross-section view of an electron beam machine employing my invention.

FIGURE 2 is an enlarged isometric view of one embodiment of my invention.

FIGURE 3 is a back view of apparatus of FIGURE 2.

Referring now to FIGURE 1, there is shown an electron beam machine of the type which utilized a movable electron beam generator. This machine comprises a large evacuated chamber 10 into which is inserted, through means such as an air lock, not shown, a workpiece 12. Workpiece 12 may, for example, be two metallic parts that are to be welded together with the electron beam. The electron beam generator 14 comprises a cathode 16 for emitting electrons which are accelerated toward the workpiece by the difference in potential between the cathode and a grounded anode 18. Surrounding cathode 16 is a cup-shaped control electrode 20 which is biased at a voltage which is more negative than the voltage applied to cathode 16. The magnitude of this bias controls the beam current and, due to the shape of the control electrode, also aids in the focusing of the beam. The electrons which are accelerated toward workpiece 12 are focused into a narrow beam, indicated by reference numeral 22, by a magnetic lens assembly 24. The beam generator 14 is movable about both the longitudinal and latitudinal axes of work chamber 10. As shown in FIGURE 1, the beam generator may be moved left or right by driving it, by means not shown, along a track 26. To accomplish motion in a direction transverse to that mentioned above, the track 26 may be moved, by means not shown, by driving it along a pair of racks 28 attached to opposite sides of chamber 10. To accommodate a workpiece of variable height, the focal point of beam 22 may be varied by adjusting the current to magnetic lense assembly 24.

The area being worked by beam 22 is observed by the operator through a leaded glass viewing port 30 in the side of chamber 10. The light path between the point of beam impingement and the viewing port 30 is indicated by a broken line in FIGURE 1. As can be seen from this figure, the image of the area being worked is reflected to port 30 by a mirror assembly 32 which is securely attached to the beam generator 42 by a support member 46. Mirror assembly 32 thus moves with beam generator 14. Viewing port 30 is of sufficient length to permit observance of the point of beam impingement on the workpiece regardless of the position of beam generator 14. It is necessary that port 30 be comprised of leaded glass in order to protect the operator from X-rays generated when the highly energized electrons in beam 22 impinge on the workpiece 12. Since the light given off during an electron beam operation is similar to that generated during an electric arc welding process, it is also necessary to utilize a polarizing filter 31, which may be adjusted by rotation on the exterior side of port 30 to cut down the intensity of light passing to the operator to a level where the beam impingement point can be observed without eye strain or damage. If deemed desirable at any time, a means to magnify the image passing through port 30 may be brought into abutting relation to the exposed side of filter 31 at a point opposite to the location of mirror assembly 32 at that time.

Referring now to FIGURE 2, there is shown an enlarged view of mirror assembly 32. This assembly comprises a highly polished steel mirror 34 which is affixed by suitable means, such as brazing, to a web member 35 which is in turn welded to a frame 36. I have found it to be desirable to use a metallic mirror since the X-rays emanating from the workpiece will, as is well known, cause discoloration of a glass mirror. Also affixed to frame 36 are a pair of rollers 38 and 40. Roller 38, which is biased to impede its free rotation by spring means, not shown, serves as a supply reel for a transparent film 42 which may be Mylar with a conductive coating deposited thereon. This conductive coating, while not always necessary, will be grounded and will thus bleed off static charges which would otherwise build up on the film and cause unwanted deflection of the electron beam. Film 42 is stretched across the exposed surface of mirror 34 and threaded into or otherwise securely attached to roller 40. The transparent film 42 is pulled from roller 38 across the surface of mirror 34 and wound up on roller 40 by means of driving roller 40 with a motor 44. As can be seen from FIGURES 1 and 3, the angle which mirror 34 makes with the surface of workpiece 12 may be adjusted manually by loosening the bolts which holds the support member 46 in a bracket 48 which is affixed to the back of the web member 35. It should be noted that it is possible, by use of means known in the art, to make mirror 34 adjustable in response to the activation of control means located outside the evacuated chamber.

In operation, as vapor deposits accumulate on the film 42, the operator may energize motor 44 and thus advance the film to a point where an unimpaired view of the workpiece is achieved. Alternatively, motor 44 may be driven at a constant speed thus relieving the operator of this task. As should be obvious to those skilled in the art, my invention has great utility in that it accomplishes optical viewing of a region being worked with an electron beam by use of a novel arrangement of a mirror with a suitable vapor intercepting film. My invention thus produces more efficient operation of the electron beam machine since it eliminates the previously required shut-down periods for cleaning or replacing elements such as the mirrors which reflected the image of the workpiece to the operator.

While a preferred embodiment of my invention has been shown and described, various modifications and substitutions may be made without deviating from the scope and spirit thereof. For example, my invention may be used, without modification, to view a workpiece being operated upon by an intense beam of light produced by a Laser or an electron beam generated by a machine which does not rely on vacuum operation. Also, the mirror assembly of my invention may be comprised of a pair of mirrors so arranged as to present a right side up image to the operator and this assembly may be caused to scan the workpiece by remotely controlling the angle the assembly makes with the surface of the workpiece. Thus, my invention is described by way of illustration rather than limitation and accordingly it is understood that my invention is to be limited only by the appended claim taken in view of the prior art.

I claim:

Apparatus for working materials by means of a beam of electrons comprising:

an evacuable chamber, an electron beam generator, means movably supporting said beam generator within said chamber, means for supporting an object to be worked in said chamber in a position such that the electron beam generated by said beam generator may impinge thereon, means for producing relative motion between said object supporting means and the axis of the beam of electrons, image reflecting means, means attached to said beam generator for supporting said reflecting means adjacent the axis of the electron beam in a position such that an image of the desired beam impingement point on the object to be worked is angularly reflected by said reflecting means, means so located in a wall of said chamber as to intercept the image angularly reflected from said reflecting means means for permitting passage out of the chamber of the image without coincident leakage of environmental gas into the chamber whereby viewing of the desired beam impingement point from the exterior of the chamber is enabled, first means mounted for movement with said beam generator, and means providing for storage of a roll of transparent material adjacent said reflecting means, and second means mounted for movement with said beam generator, said second means being supported adjacent said reflecting means for advancing a sheet of transparent material from said storage means across the light path between said reflecting means and the object to be worked whereby the sheet of transparent material intercepts vapors released from the object due to impingement of the beam thereon and thus prevents impairment of the reflecting means.

References Cited by the Examiner

| | | |
|---|---|---|
| 2,746,420 | 5/56 | Steigerwald. |
| 3,009,050 | 11/61 | Steigerwald. |
| 3,112,391 | 11/63 | Sciaky _____ 219—124 |

RICHARD M. WOOD, *Primary Examiner.*

JOSEPH V. TRUHE, *Examiner.*

UNITED STATES PATENT OFFICE
CERTIFICATE OF CORRECTION

Patent No. 3,156,810                                              November 10, 1964

Fred H. Samuelson

It is hereby certified that error appears in the above numbered patent requiring correction and that the said Letters Patent should read as corrected below.

Column 4, line 31 should not appear as the beginning of a new paragraph and should be indented so as to be part of the paragraph beginning at line 29; same column 4, line 37, for "and" read -- said --.

Signed and sealed this 30th day of March 1965.

(SEAL)
Attest:

ERNEST W. SWIDER                                        EDWARD J. BRENNER
Attesting Officer                                             Commissioner of Patents